United States Patent
Zhao

(10) Patent No.: US 10,428,254 B2
(45) Date of Patent: Oct. 1, 2019

(54) BIO-ADHESIVES

(71) Applicant: CAMBOND LIMITED, Cambridge (GB)

(72) Inventor: Xiaobin Zhao, Cambridge (GB)

(73) Assignee: CAMBOND LIMITED, Cambridge (GB)

( * ) Notice: Subject to any disclaimer, the term of this patent is extended or adjusted under 35 U.S.C. 154(b) by 0 days.

(21) Appl. No.: 15/110,425

(22) PCT Filed: Mar. 6, 2015

(86) PCT No.: PCT/GB2015/050668
§ 371 (c)(1),
(2) Date: Oct. 6, 2016

(87) PCT Pub. No.: WO2015/104565
PCT Pub. Date: Jul. 16, 2015

(65) Prior Publication Data
US 2017/0107411 A1    Apr. 20, 2017

(30) Foreign Application Priority Data

Jan. 8, 2014  (GB) .................................. 1400267.9
Jan. 13, 2014  (CN) .......................... 2014 1 0013650
Jan. 27, 2014  (GB) .................................. 1401275.1

(51) Int. Cl.
| | | |
|---|---|---|
| *C09J 199/00* | (2006.01) |
| *B27N 3/00* | (2006.01) |
| *B27N 3/02* | (2006.01) |
| *B27N 3/04* | (2006.01) |
| *C08G 18/64* | (2006.01) |
| *C09J 103/02* | (2006.01) |
| *C09J 175/04* | (2006.01) |
| *C08L 3/02* | (2006.01) |
| *C08L 99/00* | (2006.01) |
| *C08G 18/73* | (2006.01) |
| *C08G 18/76* | (2006.01) |
| *C08G 18/00* | (2006.01) |
| *C08G 18/40* | (2006.01) |
| *C08K 3/22* | (2006.01) |

(52) U.S. Cl.
CPC ............ *C09J 199/00* (2013.01); *B27N 3/002* (2013.01); *B27N 3/02* (2013.01); *B27N 3/04* (2013.01); *C08G 18/003* (2013.01); *C08G 18/4081* (2013.01); *C08G 18/6446* (2013.01); *C08G 18/6484* (2013.01); *C08G 18/73* (2013.01); *C08G 18/7657* (2013.01); *C08L 3/02* (2013.01); *C08L 99/00* (2013.01); *C09J 103/02* (2013.01); *C09J 175/04* (2013.01); *C08K 2003/2206* (2013.01)

(58) Field of Classification Search
CPC .............................. C09J 199/00; C09J 189/00
See application file for complete search history.

(56) References Cited

U.S. PATENT DOCUMENTS

| | | | |
|---|---|---|---|
| 5,520,727 A | 5/1996 | Vreeland et al. | |
| 5,763,509 A | 6/1998 | Eastin et al. | |
| 8,293,821 B1 * | 10/2012 | Tillman | .................. C09J 103/02 264/533 |
| 2006/0147582 A1 * | 7/2006 | Riebel | ...................... C08L 23/10 426/61 |
| 2007/0036958 A1 * | 2/2007 | Hagemann | ................. B32B 5/16 428/218 |
| 2007/0135536 A1 * | 6/2007 | Mohanty | ............ C08G 18/0895 524/47 |
| 2008/0167436 A1 | 7/2008 | Schilling et al. | |
| 2009/0281203 A1 * | 11/2009 | Riebel | ........................ C12F 3/10 521/44 |
| 2011/0150943 A1 | 6/2011 | Speitling et al. | |
| 2011/0189479 A1 * | 8/2011 | Zhang | ..................... C08H 99/00 428/375 |
| 2012/0058701 A1 * | 3/2012 | Zhang | ..................... C08H 99/00 442/401 |

(Continued)

FOREIGN PATENT DOCUMENTS

| | | |
|---|---|---|
| CN | 1826379 A | 8/2006 |
| CN | 101475790 A | 7/2009 |

(Continued)

OTHER PUBLICATIONS

Pittorru, Rossella; PCT/GB2015/050668; International Search Report and Written Opinion; ISA/EPO; 24 pages; dated Jan. 7, 2016.
Miah, Samir; GB1400267.9; GB Search Report; 1 page; dated Jul. 23, 2015.
CN201410013650X; CN Office Action; 2 pages; dated Jan. 13, 2014.
Miah, Samir; GB1401275.1; GB Search Report; 1 page; dated Jul. 28, 2015.
"Using Dried Distillers' Grains to Make Bioadhesive", May 24, 2010, pp. 1-2, XP055066350.

*Primary Examiner* — Liam J Heincer
(74) *Attorney, Agent, or Firm* — John B. Hardaway, III; Todd A. Serbin; Nexsen Pruet, LLC

(57) ABSTRACT

Distiller's Grain (DG) based bio-adhesives consisting of DG biomass, crosslinking agents, and fillers are described as substitutes for formaldehyde based wood glue for making wood panels. Algal bio-adhesives consisting of algal biomass, crosslinking agents, and fillers are described as substitutes for formaldehyde based glue for making wood panels. Processes for preparing such DG based bio-adhesives and algal bio-adhesives are provided, comprising the steps of: combining DG biomass or algal material with a cross-linking agent and inorganic fillers to form a blend; micronization or homogenization of the blend to obtain powdery material; and mixing the powdery material with additional water to form a bio-adhesive.

21 Claims, No Drawings

(56) References Cited

U.S. PATENT DOCUMENTS

| | | | | |
|---|---|---|---|---|
| 2013/0192778 A1* | 8/2013 | Jabar, Jr. | ................ | D21H 17/67 |
| | | | | 162/135 |
| 2013/0206342 A1* | 8/2013 | Dahmes | ................... | C08H 1/00 |
| | | | | 159/4.01 |
| 2014/0171535 A1* | 6/2014 | Narayan | ............... | C07C 277/08 |
| | | | | 521/164 |

FOREIGN PATENT DOCUMENTS

| CN | 101875835 A | 11/2010 |
|---|---|---|
| CN | 102977844 A | 3/2013 |
| EP | 0565920 A1 | 10/1993 |
| GB | 1376986 A | 12/1974 |
| JP | H08269424 A | 10/1996 |
| RU | 2473692 C1 | 1/2013 |
| WO | 2007/098108 A2 | 8/2007 |
| WO | 2009/060438 A2 | 5/2009 |
| WO | 2011/042610 A1 | 4/2011 |
| WO | 2013/036744 | 3/2013 |

\* cited by examiner

BIO-ADHESIVES

DESCRIPTION 1

Field of Invention

This invention concerns novel water-resistant and versatile adhesive products and glue derived from grain-based ethanol production byproducts including CDS (condensed distiller's solubles), DDG (Distiller's Dried Grain), DDGS (Distiller's Dried Grains and Solubles) and WDG (Wet Distiller's Grain) materials. In this patent, the term Distiller's Grain (DG) is used in general. In particular, the processed DG bio-adhesives according to this invention have strong dry and wet strength and are thus useful as formaldehyde-free wood adhesive to replace currently used formaldehyde based wood adhesives. The invention further relates to DG-derived glues and adhesive products containing a cross-linked network which can be further processed into powder form to become adhesive gel or aqueous glue.

BACKGROUND ART AND RELATED DISCLOSURES

Due to the inherently finite nature of fossil fuel resources, the world faces the challenge of finding suitable renewable substitutes that can begin to replace petrochemicals both as a source of energy and as a source of materials for plastics, rubbers, fertilizers, and fine chemicals. More recently, biofuels have been endorsed as a key component of national and international strategies to reduce greenhouse gas (GHG) emissions and mitigate potential climate change effects.

Two biofuels, ethanol (ethyl alcohol) and biodiesel from fatty acid methyl esters account for the vast majority of global biofuel production and use today. These biofuels are made primarily from agricultural commodities, such as grain and sugar cane beet molasses, cassava, whey, potato and food or beverage waste for ethanol and vegetable oil for biodiesel.

In 2010, approximately 87 billion liters (23 billion gallons) of ethanol were produced, with the United States, Brazil, and the European Union accounting for 93% of this output (RFA, 2011a), which leaves large quantities of DG byproducts, mainly used for animal feeds. Two processes are primarily used to make ethanol from grains: dry milling and wet milling. In the dry milling process, the entire grain kernel typically is ground into flour (or "meal") and processed without separation of the various nutritional component of the grain. The flour is slurred with water to form a "mash". Enzymes are added to the mash, which is then processed in a high-temperature cooker, cooled and transferred to fermenters where yeast is added and the conversion of sugar to ethanol begins. After fermentation, the resulting ethanol containing mixture "beer" is transferred to distillation columns where the ethanol is separated from the residual "stillage". The stillage is sent through a centrifuge that separates the solids from the liquids. The liquids, or solubles, are then concentrated to a semi-solid state by evaporation, resulting in condensed distiller's solubles (CDS) or "syrup". CDS is sometimes sold direct into the animal feed market, but more often the residual coarse grain solids and the CDS are mixed together and dried to produce distiller's dried grain with solubles (DDGS). In the cases where the CDS is not re-added to the residual grains, the grain solids product is simply called distiller's dried grain (DDG). If the distiller's grain is being fed to livestock in close proximity to the ethanol production facility, the drying step can be avoided and the product is called wet distiller's grain (WDG). Because of various drying and syrup application practices, there are several variants of distiller's grain (one of which is called modified wet distiller's grain), but most product is marketed as DDGS, DDG or WDG. Some dry-mill ethanol plants in the United States are now removing crude maize oil from the CDS or stillage at the back end of the process, using a centrifuge. The maize oil is typically marketed as an individual feed ingredient or sold as a feedstock for further processing (e.g. for biodiesel production). The co-product resulting from this process is known as "oil extracted" DDGS or "de-oiled" DDGS. These co-products typically have lower fat content than conventional DDGS, but slightly higher concentrations of protein and other nutrients. A very small number of dry-mill plants also have the capacity to fractionate the grain kernel at the front end of the process, resulting in the production of germ, bran, "high-protein DDGS" and other products (RFA, 2011b). In some cases, ethanol producers are considering using the cellulosic portions of the maize bran as a feedstock for cellulosic ethanol. The majority of grain ethanol produced around the world today comes from the dry milling process. In the wet milling process, shelled maize is cleaned to ensure it is free from dust and foreign matter. Next, the maize is soaked in water, called "steepwater", for between 20 and 30 hours. As the maize swells and softens, the steepwater starts to loosen the gluten bonds with the maize, and begins to release the starch. The maize goes on to be milled. The steepwater is concentrated in an evaporator to capture nutrients, which are used for animal feed and fermentation. After steeping, the maize is coarsely milled in cracking mills to separate the germ from the rest of the components (including starch, fibre and gluten). Now in a form of slurry, the maize flows to the germ separators to separate out the maize germ. The maize germ, which contains about 85% of the maize's oil, is removed from the slurry and washed. It is then dried and sold for further processing to recover the oil. The remaining slurry then enters fine grinding. After the fine grinding, which releases the starch and gluten from the fibre, the slurry flows over fixed concave screens which catch the fiber but allow the starch and gluten to pass through. The starch-gluten suspension is sent to the starch separators. The collected fibre is dried for use in animal feed. The starch-gluten suspension then passes through a centrifuge where the gluten is spun out. The gluten is dried and used in animal feed. The remaining starch can then be processed in one of three ways: fermented into ethanol, dried for modified maize starch, or processed into maize syrup. Wet milling procedures for wheat and maize are somewhat different. For wheat, the bran and germ are generally removed by dry processing in a flour mill (leaving wheat flour) before steeping in water.

In 2010, an estimated 142.5 million tonnes of grain was used globally for ethanol (F.O. Licht, 2011), representing 6.3% of global grain use on a gross basis. Because roughly one-third of the volume of grain processed for ethanol actually was used to produce animal feed, it is appropriate to suggest that the equivalent of 95 million tonnes of grain were used to produce fuel and the remaining equivalent 47.5 million tonnes entered the feed market as co-products. Thus, ethanol production represented 4.2% percent of total global grain use in 2010/11 on a net basis. The United States was the global leader in grain ethanol production, accounting for 88% of total grain use for ethanol. The European Union accounted for 6% of grain use for ethanol, followed by China (3.4%) and Canada (2.3%). The vast majority of grain processed for ethanol by the United States was maize, though grain sorghum represented a small share (approximately 2%). Canada's industry primarily used wheat and maize for ethanol, while European producers principally used wheat, but also processed some maize and other coarse grains. Maize also accounted for the majority of grain use for ethanol in China.

There is huge existing market of wood glue for wood panel industry. Organic polymers of either natural or synthetic origin are the major chemical ingredients in all formulations of wood adhesives. Urea-formaldehyde is the most commonly used adhesive, which can release low concentrations of formaldehyde from bonded wood products under certain service conditions. Formaldehyde is a toxic gas that can react with proteins of the body to cause irritation and, in some cases, inflammation of membranes of eyes, nose, and throat. It is a suspected carcinogen, based on laboratory experiments with rats.

Phenol-formaldehyde adhesives, which are used to manufacture plywood, flakeboard, and fiberglass insulation, also contain formaldehyde. However, formaldehyde is efficiently consumed in the curing reaction, and the highly durable phenol-formaldehyde, resorcinol-formaldehyde, and phenol-resorcinol-formaldehyde polymers do not chemically break down in service to release toxic gas. However, it uses the petroleum-based resource and also expensive.

Increasing environmental concerns and strict regulations on emissions of toxic chemicals have forced the wood composites industry to develop environmentally friendly alternative adhesives from abundant renewable substances such as soybean protein, animal, casein, vegetable, and blood. Also, adhesives from lignin, tannin, and carbohydrates have been studied for replacement of synthetic adhesives that are dominatingly used in the manufacture of wood composite products. These adhesives are generally used for non-structural applications, due to their poor water resistance and low strength properties.

Modifications including further purification to obtain high protein contents, increases of the specific surface area of the materials, denaturation of the protein by acid, alkaline and surfactants have been shown to be useful to enhance the wood adhesive strength of soy based glue, or mixed with other synthetic adhesives such as phenol formaldehyde resin which increase the cost for manufacturing.

It would, therefore, be advantageous to provide renewable bio-adhesives which are able to be used as wood adhesives with comparable strength as the synthetic wood adhesives such as formaldehyde based glue.

It is, therefore, a primary objective of the present invention to provide a stable adhesive generally inexpensive and versatile.

It is, therefore, a further object of the present invention to provide a stable aqueous adhesive comprising DG-material derived from ethanol production, and that are safe, water-resistant for wood application. The DG materials include DDGS, CDS, DDG and WDG from byproducts of ethanol production plant.

It is a further object of the present invention to prepare DG based adhesive products that are produced by mixing dry DG materials with additives and further milled into fine powder for greater adhesive strength properties to broaden their suitability for adhesive applications, easy in storage for longer shelf-life and transportation.

It is yet a further objective of the invention to prepare DG based adhesive products that are produced by mixing dewatered DG materials, e.g. WDG and CDS (water content less than 70%) with additives and homogenised into aqueous bio-adhesives.

It is yet a further object of the invention to prepare an adhesive that consists essentially of byproducts of after ethanol distillation during ethanol biofuel process.

It is yet another object of the invention to prepare adhesive products that comprise naturally DG materials in dry form (e.g. DDGS and DDG) that are blended with a crosslinking agent to form a crosslinked network to enhance the water resistance of the adhesives.

It is further another object of the invention to mill the above mixture to greater than 80 meshes for formulation into aqueous adhesives.

It is yet another objective of the invention to prepare adhesive products that comprise above aqueous adhesives and a crosslinking agent and/or wet-strengthen agent for water-resistant wood industry application.

DETAILED DESCRIPTION OF THE INVENTION

The current invention concerns novel bio-adhesives derived from DG materials.

According to a first aspect of the invention there is provided DG based bio-adhesives consisting of DG mass, crosslinking agents and inorganic fillers, optionally other additives for making aqueous DG bio-adhesives.

According to a second aspect of the invention there is provided a process for manufacturing such DG based bio-adhesives, the process comprising the steps of:

a. Combining DG material obtained directly from ethanol production plant, such as DDGS, DDG, CDS and WDG with defined dryness and suitable protein content, a cross-linking agent, and fillers to form a blend using a mechanical mixer or blender, Whereas in step a: the DG material has the water content less than 70%; preferably less than 40%; most preferably less than 20%;

the crosslinking agent is selected from a organic polymeric material with crosslinkable groups such as poly-isocyanate, epoxy resin, or an inorganic material such as silicates, borates or mixture of polymeric crosslinker and the inorganic substance;

the fillers are calcium materials such as calcium oxide, calcium hydroxide, calcium chloride, calcium carbonate, calcium sulfate, preferably calcium oxide, calcium sulfate which can dewater during the blending process. The DG material in the blend has the content between 50-89%, crosslinking agent has 1.0-20%, and fillers are 10-30%.

b. Milling the blend via a micronisation milling machine or any other chosen mechanical wet or dry milling machine to produce fine powdery material with particle size between 80-600 meshes., preferably, between 100-500 meshes, most preferably 200-300 meshes.

c. Mixing the powdery material with additional water, optionally with addition of a defoamer or an anti-foaming agent, a thickener and optionally with a cross-linking agent or wet-strength agent, wherein defoamer is selected from food grade deformer used in milk, protein process industry, such as mineral oil, vegetable oil or white oil based deforming agent; the thickener selected are food grade water soluble natural polymer such as cellulose derivatives e.g. HPMC, CMC, proteins such as gelatin, alginate, chitosan; and water soluble polymers such as Polyvinyl alcohol (PVA), sodium polyacrylic acid (PAA) or it's copolymer. The wet strength agent is polyamideamine-epichlorohydrin (PAE), the crosslinking agent is a polymeric isocyanate or polymeric isocyanate with the isocyanate group blocked to obtain DG aqueous bio-adhesives with solid content between 20-60%, preferably 20-50%, most preferably 20-40%.

According to the invention there is provided a process for manufacturing DG based bio-adhesives, the process comprising the steps of:
a. combining DG material, a cross-linking agent and inorganic fillers to form a blend by mechanical blender;
b. Micronising or mechanical milling the blend to obtain powdery material; and
c. Mixing the powdery material with additional water, optionally with the addition of other additives such as defoaming agent, thickener, wet strength agent and a crosslinking agent to form DG based bio-adhesives.

DG biomass contains lipids, proteins, and carbohydrates that mainly is used for animal feed. Compared to soy meal, the protein content is ranged from 20-40% depending on the process of the byproduct. Typically for DDGS, the protein content is between 20-30%. Due to the nature of the origin, the cost of DG is much lower than that of soy meal. For example, the price of DDGS is about ½-⅓ of the price of soy flower.

Surprisingly it was found that DG containing 20-30% protein (dry mass) without further expensive refining to increase the protein content can be used for the current process to produce bio-adhesives. The DG biomass is the by-products directly from ethanol production plant, which are readily available as animal feed material, including CGS, DDG, DDGS and WDG. The quantity required for the formulation can be adjusted according to the protein content and the solid content of the mass.

The crosslinking agent used in current invention is polymeric isocyanate which is used to produce polyurethane. The polyisocyanate functional groups used in current invention include PMDI, PHDI, Polyurethane pre-polymer, blocked polyisocyanates such as polyisocyanates with phenol, ε-caprolactam blocked. A blocked polyisocyanate can be defined as an isocyanate reaction product which is stable at room temperature but dissociates to regenerate isocyanate functionality under the influence of heat around 100-250° C. Blocked polyisocyanates based on aromatic polyisocyanates dissociate at lower temperatures than those based on aliphatic ones. The dissociation temperatures of blocked polyisocyanates based on commercially utilized blocking agents decrease in this order: alcohols>ε-caprolactam>phenols>methyl ethyl ketoxime>active methylene compounds.

Other crosslinking agent can be used in current invention include epoxy-resins. Epoxy resins, also known as polyepoxides are a class of reactive prepolymers and polymers which contain epoxide groups. Epoxy resins are polymeric or semi-polymeric materials and An important criterion for epoxy resins is the epoxide content. This is commonly expressed as the epoxide number, which is the number of epoxide equivalents in 1 kg of resin (Eq./kg), or as the equivalent weight, which is the weight in grams of resin containing 1 mole equivalent of epoxide (g/mol). One measure may be simply converted to another:

Equivalent weight (g/mol)=1000/epoxide number (Eq./kg)

The epoxy resin can be used in current invention include Bisphenol A epoxy resin, Bisphenol F epoxy resin, Aliphatic epoxy resin and Glycidylamine epoxy resin.

The content of the polymeric crosslinking agent mixed with DG materials is between 1.0-20%.

Other crosslinking agents can be used include inorganic materials such as silicates and borates which can be used separately or mixed with above polymeric crosslinking agent. The total content is in the range of 1.0-20%, preferably in the range of 1-10%, most preferably in the range of 5-10%.

The fillers used for current application are calcium based inorganic materials. They can be used to adjust the water content of the DG materials and the reheological properties of the final bio-adhesives. They can also be useful to help the subsequent dry milling process. The more calcium materials are incorporated, the more dry blend can be obtained. The typical content of the calcium materials such as single calcium oxide, calcium chloride calcium carbonate and calcium sulfate or their mixtures is in the range of 10-30%. The optimised composition for easy to dry mill can be adjusted by changing the ratio of DG mass and the fillers.

After the blending with an industrial mechanical blender, the mixture needs to be stored for overnight (>8 hrs) before milling. The fine powder will give a homogenized mixture in order to swell in water to form bio-adhesives for easy to spray or spread for applications.

The milling process can be performed by readily available micronisation equipments, or mechanical milling machines. The particle size obtained is controlled at 80-600 meshes, preferably at 100-500 meshes, most preferably at 200-300 meshes. When WDG is used, the milling can be achieved by homogenization process, which can directly lead to final aqueous bio-adhesives.

The DG bio-adhesives can be formulated by adding above milled powder into premeasured water in a batch vessel with a mixer or pumping into a mechanical static mixer with calculated amount of water, or into a batch homogeniser or online homogeniser for continuous formulation of the aqueous bio-adhesives.

The solid content of the formed bio-adhesives is between 20-50% and preferably between 20-40%.

Optionally, in the formulation of the aqueous bio-adhesives, some additives can be added for easy manufacturing, optimized viscosity and enhanced wet strength for applications.

The additives include defoamer or an anti-foaming agent, a thickener and optionally with a crosslinking agent or wet-strength agent, wherein defoamer is selected from food grade deformer used in milk, protein process industry, such as mineral oil, vegetable oil or white oil based deforming agent; the thickener selected are food grade water soluble natural polymer such as cellulose derivatives e.g. HPMC, CMC, proteins such as gelatin, alginate, chitosan etc; or water soluble hydrogel such as PVA, PAA and PAA copolymer, the wet strength agent is polyamideamine-epichlorohydrin (PAE), the crosslinking agent is a polymeric isocyanate or a polymeric isocyanate with the isocyanate group blocked. The percentage of the additives considered to be added is in the range of 0.01-5%, preferably in the range of 0.1-5%, most preferably in the range of 0.5-5%.

The main application of current invention of DG bio-adhesives is in the field of production of wood based panels to replace formaldehyde based wood adhesives. The wood based panels include plywood, fibreboard and particle board.

The DG bio-adhesives can also be used for making paper-based board such as paper packaging board, cardboard, carton packaging material for recyclable food packaging, gift packaging and medical packaging. Other applications include adhesives for furniture used in hospital and school. The bio-adhesives can also be used to make fibreboard based on non-wood materials such as straw. The straw based fibreboard can be used as packaging materials for food. The DG bio-adhesives can also be used in marine board whereas the highly water-resistant wood board is required. Although the invention has been described in connection with specific preferred embodiments, it should be understood that the invention as claimed should not be unduly limited to such specific embodiments, various applications of the described modes of carrying out the invention which are obvious to those skilled in the art are intended to be covered by the present invention.

The invention now will be further exemplified.

Example 1: Preparation of DDGS Based Bio-Adhesive

DDGS, water content 10%, protein content 26%, lipid content 5%, was from USA. In a mechanical blender (250 KG volume capacity), 50 kg of the DDGS, 10 kg of calcium oxide powder (200 meshes) and 10 kg of sodium silicate was added and mixed for 30 mins and stored for 4 hours. To the mixture, 2 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 300 meshes. In a 500 L high-shear mixing vessel for producing coating material, 100 L water was added, and then 50 kg of above milled powder was added and mixed for 60 mins. 1 Kg PVA powder (1788) was added and mixed for another 60 mins. 100 g of defoaming agent was added to obtain the DDGS bio-adhesives ready for plywood process. The solid content is about 33%.

Application of DDGS Bio-Adhesives for Plywood:

5 pieces of poplar veneers were cut into size at 36 cm×36 cm. The above algal bio-adhesive was brushed onto one side of the first piece, one side of the last piece and the two sides of the rest of 3 pieces. Amount of bio-adhesives on each veneer was controlled with a balance. 5 pieces of poplar veneers were cross-staged. Assembled wood specimens were pressed at 3 MPa and 120° C. for 10 min or 150° C. for 5 min with a hot press. The wood assemblies were conditioned at 23° C. and 50% RH for 48 h and then cut into five pieces with overall dimensions of 80×20 mm and glued dimensions of 20×20 mm.

The cut wood specimens were conditioned for 4 additional days at the same conditions before testing. Shear strength testing was performed using an Instron (Model 4465; Canton, Mass., USA) at a crosshead speed of 1.6 mm/min according to ASTM Standard Method D906-98 (2011). Shear strength, including dry strength and wet strength, were performed following ASTM Standard Methods (ASTM D906-98 2011) at maximum load was recorded. Values reported are the average of five specimen measurements.

Water resistance test: Specimen was boiled at 100° C. for 2 hours. The specimen is removed from water and visually inspected for evidence of dismemberment.

Comparison of Urea-Formaldehyde (UF) glue and Phenol-Formaldehyde (PF) glue to make plywood: Commercially UF and PF for pressing plywood were carried out as the method shown in Example 1.

Example 2: Preparation of DDGS Based Bio-Adhesive

DDGS, water content 10%, protein content 26%, lipid content 5%, was from USA. In a mechanical blender (250 KG volume capacity), 50 kg of the DDGS, 10 kg of calcium oxide powder (200 meshes) and 10 kg of sodium silicate was added and mixed for 30 mins and stored for 4 hours. To the mixture, 2 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 300 meshes. In a 500 L high-shear mixing vessel for producing coating material, 150 L water was added, and then 50 kg of above milled powder was added and mixed for 30 mins. To the mixture, 12.5 kg of PAE and 2.5 kg of PMDI was added and mixed for 60 mins. 100 g of defoaming agent was added to obtain the algal bio-adhesives ready for plywood process. The solid content is about 30%.

The plywood using above DDGS bio-adhesive was produced according to the same method as example 1.

Example 3: Preparation of DDGS Based Bio-Adhesive

DDGS, water content 10%, protein content 26%, lipid content 5%, was from USA. In a mechanical blender (250 KG volume capacity), 50 kg of the DDGS, 10 kg of calcium oxide powder (200 meshes) and 10 kg of sodium silicate was added and mixed for 30 mins and stored for 4 hours. To the mixture, 2 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 300 meshes. In a 500 L high-shear mixing vessel for producing coating material, 100 L water was added, and then 50 kg of above milled powder was added and mixed for 60 mins. To the mixture, 5.0 kg of PMDI was added and mixed for 60 mins. 100 g of defoaming agent was added to obtain the algal bio-adhesives ready for plywood process. The solid content is about 35%.

The plywood using above DDGS bio-adhesive was produced according to the same method as example 1.

Example 4: Preparation of CDS Based Bio-Adhesive

CDS was obtained commercially from ethanol production manufacturer. The water content is about 20%, protein content 30%. To a 100 L blender, 10 kg of the CDS, 2 kg of calcium oxide powder (200 meshes) and 1 kg of sodium silicate was added and mixed for 30 mins. To the mixture, 1 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 300 meshes. In a 100 L high-shear mixing vessel for producing coating material, 40 L water was added, and then 10 kg of above milled powder was added and mixed for 30 mins. To the mixture, 1.0 kg of PMDI was added and mixed for 60 mins. 100 g of defoaming agent was added to obtain the algal bio-adhesives ready for plywood process. The solid content is about 20%.

The plywood using above WDG bio-adhesive was produced according to the same method as example 1.

Example 5: Preparation of WDG Based Bio-Adhesive

WDG was obtained commercially from ethanol production manufacturer. The water content is about 70%, protein content 10%. In a 100 L high-shear homogenizer for producing coating material, 40 L WDG was added, and to the mixture, 2 Kg sodium silicate, 1 Kg PVA(1788) and 1.0 kg of PMDI was added one by one and homogenised for 60 mins. 100 g of defoaming agent was added to obtain the WDG bio-adhesives ready for plywood process. The solid content is about 28%.

The plywood using above WDG bio-adhesive was produced according to the same method as example 1.

Example 6: Application of DG Bio-Adhesives for Preparation of Particle Board DG bio-adhesive produced in example 2 was used to prepare particle board. 150 g of DG bio-adhesive was added slowly to 600 g of pine wood particles having a moisture content of approximately 5% and mixed with a mechanical mixer. A 9-inch×9 inch×9 inch wood forming box was centered on a 12 inch×12 inch×0.1 inch stainless steel plate, which was covered with aluminum foil. The wood-adhesive mixture is slowly added into the forming box to achieve a uniform density of particles coated with bio-adhesive. The mixture was compressed by hand with a plywood board and the wood forming box was carefully removed so that the particle board matte would not be disturbed. Then, the plywood board was removed, a piece of aluminum foil was placed on the matte, and another stainless steel plate was placed on top of the matte. The particle board matte was then pressed to a thickness of ¾ inch using the following conditions: 120 psi for 10 minutes at a press platen temperature of 170° C. The particle board was trimmed to 5 inches×5 inches to check the water resistant property.

Example 7: Application of DG Bio-Adhesives for Preparation of Fiber Board

DG bio-adhesive produced in example 3 was used to prepare fiber board. 200 g of DG bio-adhesive was sprayed slowly to 800 g of pine wood fiber having a moisture content of approximately 5% while mixing with a mechanical mixer. A 9-inch×9 inch×9 inch wood forming box was centered on a 12 inch×12 inch×0.1 inch stainless steel plate, which was covered with aluminum foil. The wood-adhesive mixture is slowly added into the forming box to achieve a uniform density of fibers coated with bio-adhesive. The mixture was compressed by hand with a plywood board and the wood forming box was carefully removed so that the fiber board matte would not be disturbed. Then, the plywood board was removed, a piece of aluminum foil was placed on the matte, and another stainless steel plate was placed on top of the matte. The fiber board matte was then pressed to a thickness of ¾ inch using the following conditions: 120 psi for 10 minutes at a press platen temperature of 170° C. The fiber board was trimmed to 5 inches×5 inches to check the water resistant property.

TABLE 1

Test results of plywood produced from algal bio-adhesives in example 1-7

| Plywood | Dry strength (MPa) | Wet strength (MPa) | Water resistance test (boiling water for two hours) |
| --- | --- | --- | --- |
| Example 1 | 1.8 | 0.8 | Intact |
| Example 2 | 3.0 | 1.8 | Intact |
| Example 3 | 2.5 | 1.3 | Intact |
| Example 4 | 2.5 | 1.2 | Intact |
| Example 5 | 3.0 | 1.5 | Intact |
| Example 6 | / | / | Intact |
| Example 7 | / | / | Intact |
| Formaldehyde-Urea resin | 2.5 | / | Dismemberment |
| Phenol -Urea resin | 3.4 | 1.8 | intact |

DESCRIPTION 2

The present invention is related to a distiller's grain based reinforced material and its use as a distiller's grain based non-formaldehyde glue for wood panel applications. Distiller's Grain-based reinforced material for wood-based panels and Distiller's Grain-based non-formaldehyde adhesive prepared from Distiller's Grain-based reinforced material.

The invention relates to a distiller's grain-based reinforced material for wood-based panels and a distiller's grain-based non-formaldehyde adhesive prepared from the distiller's grain-based reinforced material. The distiller's grain-based reinforced material is a powdery product obtained by stirring, curing and milling the following components by weight percent: 50% to 90% of distiller's grain, 10% to 35% of an inorganic material and 1% to 20% of a high-molecular water-resistant material. The distiller's grain can be one or more of DDGS (Distillers Dried Grains with Soluble), DDG (Distillers Dried Grains) and DDS (Distillers Dried Soluble). The distiller's grain-based non-formaldehyde adhesive is prepared by stirring and mixing the following components by weight percent: 20% to 50% of the distiller's grain-based reinforced material, 0.1% to 5% of additive and water to make up the rest. The distiller's grain-based non-formaldehyde adhesive prepared from the distiller's grain-based reinforced material really realizes the purpose of non-formaldehyde release and can be used for overcoming the defects of high raw material cost, easy deterioration and poor water resistance of the existing biological adhesive. The bonding strength and the water resistance of the distiller's grain-based non-formaldehyde adhesive reach or exceed those of the existing urea-formaldehyde adhesive and the existing phenol adhesive. Thus, the distiller's grain-based reinforced material can be used to prepare various types of wood-based panels.

BACKGROUND

The main wood-based panels have four categories including plywood, particle board, block board and fibreboard. Except the manufacturing of plywood used for the construction mould panels where phenol-formaldehyde resin is used, the mostly wood panels are manufactured using urea-formaldehyde or melamine modified urea-formaldehyde glue. Therefore, contaminated wood-based panels are mainly due to the release of formaldehyde from the adhesives. In order to solve the problem of formaldehyde contamination, new greener formaldehyde-free adhesives with low-cost and easy adoption by industry has to be researched and developed. In both China and the world, soy based formaldehyde-free biological glue and starch based glue have been developed.

However, there are some disadvantages such as the high prices of raw materials, low bonding strength, poor water resistance and less resistance to microbial degradation. Although the performance can be improved through modification process of the biological glue, the production cost has increased. In addition, the viscosity of soybean biological glue is very high, which leads to the suitability problems in the industrial process of wood based panel. For starch based biological glue, although the price is lower than soy based biological glue, it has poor water resistance and does not apply to Class 1, II and III plywood.

DETAILED DESCRIPTION OF THE INVENTION

The first objective of the present invention is to provide a Distiller's grain-based reinforced material for wood-based panels, with widely available sources of raw materials, low cost, easy to preserve, and suitable to make non-formaldehyde glue.

The technical solution to achieve the first objective of the present invention is: A distiller's grain based reinforced material used for wood-based panels with characteristics in that it is composed of distiller's grain, inorganic material, and polymeric water-resistant material by blending, curing, and milling to obtain a powder. The weight percentage of each component described above is as follows: 50 to 90% for distiller's grains, 10 to 35% for inorganic material, 1~20% for water-resistant polymer material and the sum of the weight percentage of each component is 100%;

In which, the distiller's grain is one or more of dried whole stillage of DDGS, distiller's dried crude DDG and distiller's dried solubles DDS.

The said inorganic material is a calcium compound and/or silicate, in which calcium compound and silicate with a weight ratio of 1:0 to 4. The said polymer water resistant material is a polyisocyanate, blocked polyisocyanates, and one or more epoxy resins.

The preparation method of Distiller's grain-based reinforced material for wood-based panels is: According to formulation weight percentage, mix formulated amount of distiller's grains, inorganic material, polymer water-resistant material to blend for 0.5~1 h, seal the blend to allow to stand overnight for curing, using conventional jet milling equipment for milling, collect powdery material sized at the range of 80 to 600 mesh to be used as the distiller's grain based reinforced material for wood-based panels applications.

A distiller's grain based reinforced material for wood-based panels with the characteristics in which the inorganic material of the calcium compounds can be one or several of the compounds from calcium carbonate, calcium sulfate, calcium chloride, calcium oxide, calcium hydroxide, calcium phosphate, calcium magnesium phosphate. The silicates are sodium silicate and/or potassium silicate.

The second objective of the present invention is to provide an environmentally friendly, low-cost, good water resistance, high bonding strength distiller's grain based non-formaldehyde glue.

The technical solution to achieve the second objective is: A distiller's grain based non-formaldehyde glue formulated from distiller's grain based reinforced material for wood-based panels, with the characteristics in which it is based on 20~50 wt % of distiller's grain based reinforced material, 0.1~5 wt % of the additives, the rest weight percentage amount of water as raw materials. The glue is obtained by stirring and mixing. The additives are one or more of a thickener, a defoaming agent, a wet-strengthen agent and a curing agent.

The non-formaldehyde distiller's grain based adhesive, with the characteristics in which the thickener additive is a inorganic thickener, a cellulosic thickener, a natural polymer thickening agent or it's derivative, and a synthetic polymer thickener; The de-foaming additive is a silicone oil based, a polyether based, a higher alcohol based, a mineral oil based and a vegetable oil based; The said curing agent additive is one of an organic amine, an organic acid anhydride, and a compound containing imidazole group.

The technical effects of the present invention are: ① The technology solutions to produce Distiller's grain-based reinforced material for wood-based panels are mixing distiller's grain as the main raw material with suitable amount of inorganic materials and water-resistant polymer materials. Distiller's grain is the by-products of the bioethanol production using crops such as corn, barley, sorghum, sweet potatoes and so on by fermentation. For example, three tons of corn can produce 1 tonne alcohol and 1 tonne distiller's grain. The dried whole stillage corn DDGS contains 20 to 30% crude protein, 3 to 12% of crude fat and now is currently limited to be used as a biological protein animal feed. In the present invention, it is unexpected to discover that a distiller's grain based reinforced material for making wood panels containing distiller's grains with certain amount of biological protein, fat and cellulose, combining with the suitable amount of inorganic materials and water resistant polymer material can be obtained. The material can be used to make non-formaldehyde glue to solve the problem of the release of formaldehyde from wood panels. The distiller's grain based non-formaldehyde glue derived from the Distiller's grain-based reinforced material with suitable inorganic materials and polymer waterproof material can have suitable viscosity and water resistance. With the increased shortage of oil resource, bioethanol derived from corn and wheat, etc by fermentation has become an important way to solve the energy crisis. Therefore, the production volume of the distiller's byproducts will be gradually increased with very rich sources to meet the needs of industrial production of glue. The distiller's grain based reinforced material can be easy to store and the Distiller's grain-based formaldehyde-free glue can be formulated when it is needed for wood panel production.

② Distiller's grain-based non-formaldehyde glue in the present invention is easy to prepare. It can be used with the existing process for the preparation of various types of wood-based panels to give the bonding strength and water resistance equal or superior to existing plywood made from phenolic and urea-formaldehyde glue. The wood panel has no release of formaldehyde from the glue and it is the real green products. It also solves the problems of high cost of soybean and blood glue, smells, easy to spoilage and poor water resistance.

SPECIFIC EMBODIMENTS

The following examples of the invention will be further described in the embodiments, but not limited to such specific embodiments.

All the raw materials used in the examples were commercially available, unless it has noted industrial supplies, otherwise it can be purchased through commercial channels.

Example 1B: Preparation of Distiller's Grain-Based Reinforced Material for Wood Panels Sample 1~6

① Formulation

The weight percentage of the components for present invention to make distiller's grain-based reinforced material is as follows: 50 to 90% distiller's grain, 10 to 35% inorganic material, water-resistant polymer material 1~20%, the total weight percentages of each component is 100%; inorganic material is a calcium compound and/or silicate. The weight ratio of calcium compound/silicate compound is 1:0 to 4. The specific formulations are shown in Table 1B.

TABLE 1B

| | Component | | | | | |
|---|---|---|---|---|---|---|
| | 1 Weight of component (kg) | 2 Weight of component (kg) | 3 Weight of component (kg) | 4 Weight of component (kg) | 5 Weight of component (kg) | 6 Weight of component (kg) |
| Distiller's grain | (62.5%) | (62.5%) | (64.5%) | (64.5%) | (66.7%) | (66.6%) |
| ①DDG | 100 | / | 50 | / | / | / |
| ②DDS | / | 100 | 50 | / | / | / |
| ③DDGS | / | / | / | 100 | 100 | 100 |
| In-organics | (31.25%) | (31.25%) | (25.8%) | (32.3%) | (23.3%) | (16.7%) |
| ①sodium silicate | 25 | 25 | 25 | 25 | 25 | / |
| ②Calcium Carbonate | 10 | 15 | 15 | / | / | 25 |
| ③Calcium sulfate | / | 10 | / | / | / | / |
| ④Calcium chloride | 15 | / | / | 25 | 10 | / |
| Water-resistant polymer | (6.25%) | (6.25%) | (9.7%) | (3.2%) | (10%) | (16.7%) |
| ①PHDI | / | / | / | 5 | / | / |
| ②PMDI | 10 | / | 15 | / | 15 | 25 |
| ③Epoxy resin | / | 10 | / | / | / | / |
| Total | 160 | 160 | 155 | 155 | 150 | 150 |

Note 1:
Data in brackets is the weight percentage for each component in the distiller's grain based reinforced material.
Note 2:
dried whole stillage DDGS, dry coarse distiller's grain DDG, distillers dried grains with solubles DDS are prepared by fermentation of corn starch, by-product of alcohol. Its quality conforms to GB/10647-2008 standard; Polyisocyanate PHDI (grades XL600, the Perstorp products, Sweden), polyisocyanates PMDI (grades 44V20, Bayer products); epoxy resin (grade 5881A/B, Zhongshan chemical products); the rest are commercially available industrial products.

② Preparation

According to Table 1B, weigh out the formula amount of distiller's grain, inorganic materials, polymer waterproof material and transfer them into a 500 L conical mechanical mixing equipment to mix for 0.5 h. After the mixing, the blend is sealed for aging overnight and it is milled using conventional jet milling equipment to collect 300 mesh powder to obtain distiller's grain-based reinforced material sample 1~6 respectively.

Example 2B: Preparation of Formaldehyde-Free Distiller's Grain Based Glue

The Distiller's grain-based formaldehyde-free glue in present invention has the weight percentage of distiller's grain based reinforced material at 20~50 wt %, the additive at 0.1~5 wt % and the rest being water and it is produced by mixing. The additive is one or several of thickener, defoaming agent, wet strengthen agent and curing agent.

① Preparation of Distiller's Grain Based Non-Formaldehyde Glue Sample 1A~6A

Weigh 35 kg of sample 1-6 produced according to Example 1B respectively. To each sample, 64.9 kg of water was added and stirred using a high shear mixer used in paint industry at the speed of 300 revolutions/min. After stirring for 1 hour, add 0.1 kg silicone based defoamers (grades FAG470, Union Carbide Corporation), and mix at 100 rev/min for 1 hour to obtain the Distiller's grain based glue without formaldehyde sample IA~6A ② Preparation of Distiller's Grain-Based Formaldehyde-Free Glue 7A~8A Weigh 35 kg of sample 2 and 6 prepared in Example 1B respectively and to each sample, 59.9 kg of water was added and stirred using a high shearing machine used the paint industry at 300 rpm/stirred for I hour. Then 4.9 kg of wet strengthen agent polyamide epichlorohydrin resin (grades MS, Zibo Chemical Co., St. Enoch product) and 0.1 kg silicone based defoamers (grades FAG470, Union Carbide Corporation) were added and mixed at 100 rev/min for 1 hour to obtain Distiller's grain-based formaldehyde-free glue 7A and 8A.

Test of Distiller's Grain-Based Formaldehyde-Free Adhesive Properties (a) Preparation of Plywood Samples for Testing Seven layers of plywood was produced using distiller's grain based non-formaldehyde glue IA~8A from Example 2B.

① Raw Materials

Veneer sheet size: horizontal sheet size 1230×930 mm, vertical sheet size 930×615 mm: 100 kg of Distiller's grain-based formaldehyde free glue IA~8A;

② The Specific Preparation Method for Plywood is as Follows:

The horizontal veneers and vertical veneers were passed through a four roller coating machine to get double side coated with glue. The glue coated veneers were cross-staggered and cold pressed for 45 minutes. After repairing any defects of the cold-pressed plywood, the staged 5-layer plywood was transferred to a hot pressing machine to press for 10 minutes at the temperature of 120° C. and a pressure of 100 kg. After sanding, the 5-layer plywood was produced. Further coating glue on top and bottom side of the 5-layer plywood and cover two sheets of wood veneers on top and bottom of the 5-layer plywood for cold press. After repairing any defects, the plywood was subjected to hot press under the same conditions as described above to obtain 7-layers plywood. The resulting 7-layer plywood was sawn into 8.0 cm×2.5 cm strips as specimens for testing.

(b) Determination of Dry Shear Strength of the Specimen

The specimens produced using the said distiller's grain based non-formaldehyde glue 2A, 4A~8A were stored at room temperature for a week. Then, the dry shear strength was tested according to GB/T9846-2004 method. The 7-layer plywood produced using conventional urea-formaldehyde and phenol-formaldehyde glue was compared. Test results are shown in Table 2B.

(c) Determining the Shear Strength of Wet Specimens 7-layer plywood specimen prepared using Distiller's grain based non-formaldehyde glue 2A, 4A~8A were immersed in boiling water for 4 h, then separately placed the flat specimen in an air convection drying oven set at 63±3° C. for 20 h, then immersed the specimen in boiling water for 4 h again. Removing the specimen from the water and cooling at room temperature for 10 min. In accordance with GB/T9846-2004 method, the wet shear strength of the specimen was tested. In comparison, 7-layer plywood specimen produced using conventional urea-formaldehyde glue and phenol-formaldehyde glue was tested. Test results are shown in Table 2B.

TABLE 2B

| Type of Glue Samples | Dry shear strength, MPas | Wet shear strength, MPas |
| --- | --- | --- |
| 2A | 2.6 | 0.8 |
| 4A | 2.0 | 1.5 |
| 5A | 3.8 | 1.8 |
| 6A | 4.5 | 1.6 |
| 7A | 3.2 | 2.0 |
| 8A | 4.0 | 2.8 |
| Urea formaldehyde, solid content 50 wt % | 2.0 | dismembered |
| Phenol-formaldehyde, solid content 50 wt % | 4.5 | 3.5 |

Note:
The higher dry shear strength, the stronger adhesive bonding; the higher the wet shear strength indicates the better water resistance.

The test results in Table 2B show:

① The dry shear strength of the plywood produced using distiller's grain base formaldehyde-free glue of the present invention is greater than the plywood produced using urea-formaldehyde glue and close or equivalent to the plywood produced using phenol-formaldehyde glue, indicating distiller's grain based formaldehyde-free glue has the equivalent degree of adhesive strength to the existing formaldehyde glue. The wet shear strength was significantly higher than urea-formaldehyde glue, and close to the phenol formaldehyde glue, showing distiller's grain based formaldehyde-free glue has good water resistance compared to existing formaldehyde glue.

② 2A and 7A were produced using the same distiller's grain based reinforced material sample 2; 6A and 8A were produced using the same distiller's grain based reinforced material sample 6. In the preparation of 7A and 8A, the polyamide epichlorohydrin wet strengthen resin were added, which resulting higher wet shear strength and dry shear strength. This indicates that polyamide epichlorohydrin wet strengthen agent can improve the bonding strength of sample 7A and 8A, particularly the water resistance has been significantly improved.

(D) Test the Water Resistance of Specimen 1A-8A distiller's grain based formaldehyde-free glue produced 7-layer plywood specimen were placed in water at room temperature for 1 month; at 70° C. and 100° C. water for two hours and 4 hours and then checked with the naked eye to observe whether the sheet layers have opened up. In comparison, 7-layer plywood specimen produced using conventional urea-formaldehyde glue and phenol-formaldehyde glue was tested. Test results are shown in Table 3B.

TABLE 3B

| Type of glue used | Water at Room temperature 1 month | 70 C. water 2 hours | 100 C. water 4 hours |
| --- | --- | --- | --- |
| 1A | intact | intact | Partially dismembered |
| 2A | intact | intact | Intact |
| 3A | intact | Partially dismembered | Partially dismembered |
| 4A | intact | intact | Intact |
| 5A | intact | intact | Intact |
| 6A | intact | intact | Intact |
| 7A | intact | intact | Intact |
| 8A | intact | intact | Intact |
| Urea-Formaldehyde | dismembered | dismembered | Dismembered |
| Phenol-formaldehyde | intact | intact | Intact |

Test results as shown in Table 3B indicate that distiller's grain based non-formaldehyde glue in present invention has better water resistance than urea-formaldehyde glue, and has equivalent result to phenol formaldehyde glue but achieving no formaldehyde release from the glue.

The Distiller's grain-based formaldehyde-free glue can be used to prepare medium density fiberboard by the conventional method. The test result of its internal bond strength is 0.70 N/mm2, surface bonding strength is 0.8 N/mm2, the elastic modulus is 4000 N/mm2, the thickness swelling (24 h) is less than 15%. It can meet the requirements of national standard for medium density fibreboard manufacturing.

The Distiller's grain-based formaldehyde-free glue can be used to prepare chipboard by the conventional method. The test result of its internal bond strength is 0.80 N/mm2, the elastic modulus is 3500 N/mm2 and the thickness swelling (24 h) is less than 15%. It can meet the requirements of national standard for chipboard. The present invention utilizes corn and wheat based distiller's grains from byproducts of bioethanol production to make distiller's grain based reinforced material and then further formulate the material into distiller's grain based non-formaldehyde glue. In line with current environmental requirements, the invention can achieve the objective of no release of formaldehyde from the glue. It also solves the problems of high cost, easy to spoilage and poor water resistance of biological glue. The glue has reached and exceeded the adhesion properties and water resistance of current urea-formaldehyde and phenol formaldehyde. It can be used to prepare various types of wood-based panels.

DESCRIPTION 3

Field of Invention

This invention concerns novel and versatile adhesive products and glue derived from algal materials. In particular, the processed algal adhesive materials have dry and wet strength similar to those produced using formaldehyde and phenol based processes that are the standard adhesives in industry. Algal based adhesives have the potential to replace currently used formaldehyde based wood adhesives, thus providing a low carbon, low toxicity and sustainable source of adhesives. Depending on the purity and source of the algal material, the modified bio-adhesives can also be used in more demanding 'niche' applications such as biomedical, marine, and automotive industrial applications. The invention further relates to algal-derived glues and adhesive products containing a cross-linked network which can be further processed into powder form to become adhesive gel or aqueous glue which would be amenable to many industrial manufacturing processes.

BACKGROUND ART AND RELATED DISCLOSURE

The manufacture of adhesives is a global multi-$Billion industry. The largest quantity of adhesive is used in the construction industry for the production of millions of tonnes of plywood, fibreboard and particleboard every year.

The huge volume of adhesives manufacture leads to two main problems:

The limited stocks and the price of oil on which much adhesive chemistry is based (formaldehyde and phenol)

The toxicity of the adhesive products due to their containing formaldehyde and phenol Due to the inherently finite nature of fossil fuel resources, the world faces the challenge of finding suitable renewable substitutes that can begin to replace petrochemicals both as a source of energy and as a source of materials for plastics, rubbers, fertilizers, and fine chemicals.

The other significant issue and cause of public concern is the potential toxicity of current adhesives. Organic polymers of either natural or synthetic origin are the major chemical ingredients in all formulations of wood adhesives. Urea-formaldehyde is the most commonly used adhesive, which can release low concentrations of formaldehyde from bonded wood products under certain service conditions. Formaldehyde is a toxic gas that can react with proteins of the body to cause irritation and, in some cases, inflammation of membranes of eyes, nose, and throat. It is a suspected carcinogen, based on laboratory experiments with rats and many people have identified it as a potential factor in 'sick building' syndrome.

Phenol-formaldehyde adhesives, which are used to manufacture plywood, flakeboard, and fiberglass insulation, also contain formaldehyde. However, formaldehyde is efficiently consumed in the curing reaction, and the highly durable phenol-formaldehyde, resorcinol-formaldehyde, and phenol-resorcinol-formaldehyde polymers do not chemically break down in service to release toxic gas. However, it uses the petroleum-based resource and also expensive.

Increasing environmental concerns and strict regulations on emissions of toxic chemicals have forced the wood composites industry to develop environmentally friendly alternative adhesives from abundant renewable substances such as soybean protein, animal, casein, vegetable, and blood. Also, adhesives from lignin, tannin, and carbohydrates have been studied for replacement of synthetic adhesives that are the main adhesives used in the manufacture of wood composite products.

However, these types of adhesives suffer from technical disadvantages. These adhesives are generally used for non-structural applications, due to their poor water resistance and low strength properties. Modifications including further purification to obtain high protein contents, increases of the specific surface area of the materials, denaturation of the protein by acid, alkaline and surfactants have been shown to be useful to enhance the wood adhesive strength. However, these modifications significantly increase the cost for manufacturing.

It would, therefore, be advantageous to provide adhesives which are low carbon and sustainable produced and which have low toxicity but retain the strength of the current range of formaldehyde or phenol based adhesives.

One of the possible alternatives to petroleum-based fuels and products is biomass such as algae. Algae biomass contains lipids, proteins, and carbohydrates that can be processed into fuels or other valuable co-products through chemical, biochemical, or thermochemical means. The lipids are of particular interest in current research due to the ability to use the algal oils to produce biodiesel. Algae stands out from other sources of biomass with respect to lipid production with some estimates stating that algae is capable of producing up to 30 times as much oil per unit area of land as conventional oilseed crops under ideal conditions. Additionally, algae has the added benefit of not competing with traditional food crops because it can be grown on marginal lands and can utilize brackish or waste water resources.

Other than investigating algal lipids and biodiesel production, this invention has focused on the algal mass for use in bio-adhesives in wood composite process and other applications. The use of algae as a 'feedstock' source for the production of adhesives offers the advantages of 'low carbon' processes, sustainability and 'greener' production processes.

It is, therefore, a primary objective of the present invention is to provide a description of an algae-based adhesive which is strong, versatile and inexpensive to manufacture.

It is, therefore, a further object of the present invention to provide a stable aqueous adhesive comprising algal-material derived from naturally occurring blue algae, brown algae (Phaeophytes), red algae (Rhodophytes), that are safe and water-resistant for wood application.

It is a further object of the present invention to prepare algae based adhesive products that are produced by mixing dry algae materials with additives and further milled into fine powder. This acts to increase the adhesive strength and broaden their suitability for adhesive applications. This also has the additional advantage of generating a product that is easy to store for longer shelf-life and transportation.

It is yet a further objective of the invention to prepare algae based adhesive products that are produced by mixing dewatered algae materials, e.g. algae blue (water content less than 70%) with additives and homogenized into aqueous bio-adhesives.

It is yet a further object of the invention to prepare an adhesive that consists essentially of byproducts of naturally occurring algal after biofuel process.

It is yet a further object of the invention to prepare an adhesive made from algae genetically engineered or modified to enhance their growth rate or production efficiency.

It is yet another object of the invention to prepare adhesive products that comprise naturally algal materials in dry powder form (less than 500 μm) that are blended with a multifunctional crosslinking agent to form a crosslinked network to enhance the water resistance of the adhesives.

It is further another object of the invention to mill the powder to be less than 250 μm for formulation into aqueous adhesives.

It is yet another objective of the invention to prepare adhesive products that comprise above aqueous adhesives and optionally a wet-strengthen agent or/and a crosslinking agent for water-resistant wood industry application and other niche applications.

DETAILED DESCRIPTION OF THE INVENTION

The current invention concerns novel bio-adhesives derived from algal materials.

According to a first aspect of the invention there is provided algae based bio-adhesives consisting of algae mass, crosslinking agents and inorganic fillers and optionally other additives for making aqueous algal bio-adhesives.

According to a second aspect of the invention there is provided a process for manufacturing such algal based bio-adhesives, the process comprising the steps of:
 a. Combining algal material obtained directly from green-blue algae, red algae, brown algae or biodiesel byproducts of algae with defined dryness and suitable protein content, a cross-linking agent, and fillers to form a blend using a mechanical mixer or blender,
 Whereas in step a: the algal material has the water content less than 70%; preferably less than 40%; most preferably less than 20%;
 the crosslinking agent is selected from a organic polymeric material with crosslinkable groups such as poly-isocyanate, epoxy resin, or an inorganic material such as silicates, borates or mixture of polymeric crosslinker and the inorganic substance;
 the fillers are calcium materials such as calcium oxide, calcium hydroxide, calcium chloride, calcium carbonate, calcium sulfate, preferably calcium oxide, calcium sulfate which can dewater during the blending process. The algal material in the blend has the content between 50-89%, crosslinking agent has 1.0-20%, and fillers are 10-30%.
 b. Milling the blend via a micronisation milling machine or any other chosen mechanical milling machine to produce powdery material with particle size between 30-500 μm, preferably, between 30-250 μm, most preferably 30-125 μm.
 c. Mixing the powdery material with water, optionally with addition of a defoamer or an anti-foaming agent, a thickener and optionally with a crosslinking agent or wet-strength agent, wherein defoamer is selected from food grade deformer used in milk, protein process industry, such as mineral oil, vegetable oil or white oil based deforming agent; the thickener selected are food grade water soluble natural polymer such as cellulose derivatives e.g. HPMC, CMC, proteins such as gelatin, alginate, chitosan; the wet strength agent is polyamideamine-epichlorohydrin (PAE), the crosslinking agent is a polymeric isocyanate with the isocyanate group blocked to obtain algal aqueous bio-adhesives with solid content between 20-60%, preferably 20-50%, most preferably 20-40%.

According to the invention there is provided a process for manufacturing algae based bio-adhesives, the process comprising the steps of:
 a. combining algal material, a cross-linking agent and inorganic fillers to form a blend by mechanical blender;
 b. Micronising the blend to obtain powdery material; and
 c. Mixing the powdery material with water, optionally with the addition of other additives such as defoaming agent, thickener, wet strength agent and another cross-linking agent to form algal based bio-adhesives.

In the present invention to make algal based bio-adhesives, the algal materials can be obtained from Cladophora, which appears to be one of the most abundant types of algae in streams, rivers, and ponds around the world. They can be cultivated in open ponds and closed photobioreactors. While open pond cultivation requires less energy and has lower capital cost, photobioreactors have the potential to produce larger quantities of algal biomass and minimize contamination. In addition algae can be obtained from unwanted natural incidents of excessive local growth. For example, in China, there are bursts of large growth of blue algae every year in the national river system and there are growths ('blooms') of red and brown algae along the seashore due to excessive fertilizer use. The algae materials used from a variety of sources have been harvested directly by float collection from water or sea or by other common harvesting methods including sedimentation, flocculation, centrifugation, filtration, and flotation with float collection. Following harvesting, the algal biomass is typically dried to increase shelf life. Many methods of drying can be used, including spray-drying, drum-drying, and sun-drying. Typical water content of the algae after harvesting is around 40-70%. Further drying can obtain a dry mass with water content less than 40% and typically less than 20% making it suitable for the current invention.

Once the algae are dry, the cells must be disrupted to release the lipids for biodiesel production. Cell disruption methods vary according to the properties of the algal species used. Some common methods of cell disruption are cell homogenizing, bead milling, ultrasounds, autoclaving, freezing, organic solvents, and enzyme reactions. The byproducts after removal of lipids can also be used for current invention.

The important byproducts after removal of lipids are proteins and carbohydrates. Some algae contain up to 60% protein. A well-known alga that is currently cultivated for its protein content is the cyanobacterium species *Athrospira*, better known as *Spirulina*.

*Spirulina* is reported to contain not only around 60% raw protein, but also vitamins, minerals and many biologically active substances. Its cell wall consists of polysaccharides, has a digestibility of 86 percent, and can be easily absorbed by the human body. *Spirulina* can be easily cultivated in mass production in china, India and USA. It is one of the sources of raw algae materials used in the examples in the current invention.

Other algae species are known to have high protein content can also be used as feed materials for the invention as shown in Table 1C. Despite its high protein content, algae has not gained significant importance as food or food substitute yet. Strict approval regulations for new foodstuffs are a barrier, but also the lack of texture and consistency of the dried biomass, its dark green colour and its slight fishy smell are undesirable characteristics for the food industry. However, this does not affect the uses for this invention.

TABLE 1C

General composition of % dry mass of different algae materials (Becker, E. W. (2007). "Micro-algae as a source of protein." Biotechnology Advances 25(2): 207-210)

| Alga | Protein | Carbohydrates | Lipids |
| --- | --- | --- | --- |
| *Anabaena cylindrical* | 43-56 | 25-30 | 4-7 |
| *Aphanizomenon flos-aquae* | 62 | 23 | 3 |
| *Chlamydomonas rheinhardii* | 48 | 17 | 21 |
| *Chlorella pyrenoidosa* | 57 | 26 | 2 |

TABLE 1C-continued

General composition of % dry mass of different algae materials (Becker, E. W. (2007). "Micro-algae as a source of protein." Biotechnology Advances 25(2): 207-210)

| Alga | Protein | Carbohydrates | Lipids |
|---|---|---|---|
| Chlorella vulgaris | 51-58 | 12-17 | 14-22 |
| Dunaliella salina | 57 | 32 | 6 |
| Euglena gracilis | 39-61 | 14-18 | 14-20 |
| Porphyridium cruentum | 28-39 | 40-57 | 9-14 |
| Scenedesmus obliquus | 50-56 | 10-17 | 12-14 |
| Spirogyra sp. | 6-20 | 33-64 | 11-21 |
| Arthrospira maxima | 60-71 | 13-16 | 6-7 |
| Spirulina platensis | 46-63 | 8-14 | 4-9 |
| Synechococcus sp. | 63 | 15 | 11 |

The crosslinking agent used in current invention is polymeric isocyanate which is used to produce polyurethane. The polyisocynate functional groups used in current invention include PMDI, PHDI, Polyurethane pre-polymer, blocked polyisocynates such as polyisocyanates with phenol, ε-caprolactam blocked. A blocked polyisocyanate can be defined as an isocyanate reaction product which is stable at room temperature but dissociates to regenerate isocyanate functionality under the influence of heat around 100-250° C. Blocked polyisocyanates based on aromatic polyisocyanates dissociate at lower temperatures than those based on aliphatic ones. The dissociation temperatures of blocked polyisocyanates based on commercially utilized blocking agents decrease in this order: alcohols>ε-caprolactam>phenols>methyl ethyl ketoxime>active methylene compounds.

Other crosslinking agent can be used in current invention include epoxy-resins. Epoxy resins, also known as polyepoxides are a class of reactive prepolymers and polymers which contain epoxide groups. Epoxy resins are polymeric or semi-polymeric materials and An important criterion for epoxy resins is the epoxide content. This is commonly expressed as the epoxide number, which is the number of epoxide equivalents in 1 kg of resin (Eq./kg), or as the equivalent weight, which is the weight in grams of resin containing 1 mole equivalent of epoxide (g/mol). One measure may be simply converted to another:

Equivalent weight (g/mol)=1000/epoxide number (Eq./kg)

The epoxy resin can be used in current invention include Bisphenol A epoxy resin, Bisphenol F epoxy resin, Aliphatic epoxy resin and Glycidylamine epoxy resin.

The content of the polymeric crosslinking agent mixed with algal materials is between 1.0-20%.

Other crosslinking agents can be used include inorganic materials such as silicates and borates which can be used separately or mixed with above polymeric crosslinking agent. The total content is in the range of 1.0-20%, preferably in the range of 1-10%, most preferably in the range of 5-10%.

The fillers used for current application are calcium based inorganic materials. They can be used to dewater the algal materials and adjust the reheological properties of the final bio-adhesives. They can also be useful to help the subsequent milling process. The more calcium materials are incorporated, the more dry blend can be obtained. The typical content of the calcium materials such as single calcium oxide, calcium chloride calcium carbonate and calcium sulfate or their mixtures is in the range of 10-30%. The optimised composition for easy to mill can be adjusted by changing the ratio of algal mass and the fillers.

After the blending with an industrial mechanical blender, the mixture needs to be stored for overnight (>8 hrs) before milling. The purposes of the subsequent milling process has two aspects: one is to break the cell walls of the algal materials to release the protein and the second is to have a homogenized mixture in powder form to be able to form bio-adhesives for easy to spray or spread for applications. The milling process can be performed by readily available micronisation equipments, or mechanical milling machines, including Jet Milling machine, ball milling machine, mechanical grinding machine etc. The particle size obtained is controlled at 30-500 µm, preferably at 30-250 µm, most preferably at 30-125 µm.

The algal bio-adhesives can be formulated by adding above milled powder into premeasured water in a batch vessel with a mixer or pumping into a mechanical static mixer with calculated amount of water, or into a batch homogeniser or online homogeniser including French Press, Manton-Gaulin homogeniser for continuous formulation of the aqueous bio-adhesives.

The solid content of the formed bio-adhesives is between 20-50% and preferably between 20-40%.

Optionally, in the formulation of the aqueous bio-adhesives, some additives can be added during manufacturing to obtain optimized viscosity and enhanced wet strength for applications.

The additives include defoamer or an anti-foaming agent, a thickener and optionally with a crosslinking agent or wet-strength agent, wherein defoamer is selected from food grade deformer used in milk, protein process industry, such as mineral oil, vegetable oil or white oil based deforming agent; the thickener selected are food grade water soluble natural polymer such as cellulose derivatives e.g. HPMC, CMC, proteins such as gelatin, alginate, chitosan etc; the wet strength agent is polyamideamine-epichlorohydrin (PAE), the crosslinking agent is a polymeric isocyanate with the isocyanate group blocked. The percentage of each additive considered to be added is in the range of 0.01-5%, preferably in the range of 0.1-5%, most preferably in the range of 0.5-5%.

The main application of current invention of algal bio-adhesives is in the field of production of wood based panels to replace formaldehyde based wood adhesives. The wood based panels include plywood, fibreboard and particle board. The algal bio-adhesives can also be used for making paper-based board such as paper packaging board, cardboard, carton packaging material for recyclable food packaging, gift packaging and medical packaging. Other applications include adhesives for furniture used in hospital and school. The bio-adhesives can also be used to make fibreboard based on non-wood materials such as straw. The straw based fibreboard can be used as packaging materials for food. The algal bio-adhesives can also be used in marine board whereas the highly water-resistant wood board is required. Although the invention has been described in connection with specific preferred embodiments, it should be understood that the invention as claimed should not be unduly limited to such specific embodiments, various applications of the described modes of carrying out the invention which are obvious to those skilled in the art are intended to be covered by the present invention.

The invention now will be further exemplified.

Example 10 Preparation of Algal Bio-Adhesive

Cyanobacteria or blue-green algae was obtained from Tai Lake blue-green algae treatment station in China. It was centrifuged to obtain a dry mass with 40% water content and the particle size is less than 500 μm. In a mechanical blender (250 KG volume capacity), 70 kg of the blue-green algae, 10 kg of calcium oxide powder (200 meshes) and 10 kg of sodium silicate was added and mixed for 30 mins. To the mixture, 2 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 38 μm. In a 500 L high-shear mixing vessel for producing coating material, 100 L water was added, and then 50 kg of above milled powder was added and mixed for 60 mins. 100 g of defoaming agent was added to obtain the algal bio-adhesives ready for plywood process. The solid content is about 33%.

Application of Algal Bio-Adhesives for Plywood:

5 pieces of poplar veneers were cut into size at 36 cm×36 cm. The above algal bio-adhesive was brushed onto one side of the first piece and one side of the last piece. Two sides of the rest of 3 pieces. Amount of bio-adhesives on each veneer was controlled with a balance. 5 pieces of poplar veneers were cross-staged. Assembled wood specimens were pressed at 3 MPa and 120° C. for 10 min with a hot press. The wood assemblies were conditioned at 23° C. and 50% RH for 48 h and then cut into five pieces with overall dimensions of 80×20 mm and glued dimensions of 20×20 mm.

The cut wood specimens were conditioned for 4 additional days at the same conditions before testing. Shear strength testing was performed using an Instron (Model 4465; Canton, Mass., USA) at a crosshead speed of 1.6 mm/min according to ASTM Standard Method D906-98 (2011). Shear strength, including dry strength and wet strength, were performed following ASTM Standard Methods (ASTM D906-98 2011) at maximum load was recorded. Values reported are the average of five specimen measurements.

Water resistance test: Specimen was boiled at 100° C. for 2 hours. The specimen is removed from water and visually inspected for evidence of dismemberment.

Comparison of Urea-Formaldehyde (UF) glue and Phenol-Formaldehyde (PF) glue to make plywood: Commercially UF and PF for pressing plywood were carried out as the method shown in Example 1C.

Example 2C: Preparation of Algal Bio-Adhesive

Cyanobacteria or blue-green algae was obtained from Tai Lake blue-green algae treatment station in China. It was centrifuged to obtain a dry mass with 40% water content. In a mechanical blender (250 KG volume capacity), 70 kg of the blue-green algae, 10 kg of calcium oxide powder (200 meshes) and 10 kg of sodium silicate was added and mixed for 30 mins. To the mixture, 2 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 38 μm. In a 500 L high-shear mixing vessel for producing coating material, 150 L water was added, and then 50 kg of above milled powder was added and mixed for 30 mins. To the mixture, 12.5 kg of PAE and 2.5 kg of PMDI was added and mixed for 60 mins. 100 g of defoaming agent was added to obtain the algal bio-adhesives ready for plywood process. The solid content is about 30%.

The plywood using above algal bio-adhesive was produced according to the same method as example 1C.

Example 3C: Preparation of Algal Bio-Adhesive

Cyanobacteria or blue-green algae was obtained from Tai Lake blue-green algae treatment station in China. It was centrifuged to obtain a dry mass with 40% water content. In a mechanical blender (250 KG volume capacity), 70 kg of the blue-green algae, 10 kg of calcium oxide powder (200 meshes) and 20 kg of sodium silicate was added and mixed for 30 mins. To the mixture, 1 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 125 μm. In a 500 L high-shear mixing vessel for producing coating material, 100 L water was added, and then 50 kg of above milled powder was added and mixed for 30 mins. To the mixture, 12.5 kg of PAE and 2.5 kg of PMDI was added and mixed for 60 mins. 100 g of defoaming agent was added to obtain the algal bio-adhesives ready for plywood process. The solid content is about 35%.

The plywood using above algal bio-adhesive was produced according to the same method as example 10.

Example 4C: Preparation of Algal Bio-Adhesives

Cyanobacteria or blue-green algae was obtained from Tai Lake blue-green algae treatment station in China. It was centrifuged to obtain a dry mass with 40% water content. In a mechanical blender (250 KG volume capacity), 70 kg of the blue-green algae, 10 kg of calcium oxide powder (200 meshes) and 20 kg of sodium silicate was added and mixed for 30 mins. To the mixture, 1 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 38 μm. In a 500 L high-shear mixing vessel for producing coating material, 100 L water was added, and then 50 kg of above milled powder was added and mixed for 30 mins. To the mixture, 5.0 kg of waterborne blocked polyisocyanates (WB905) was added and mixed for 60 mins. 100 g of defoaming agent was added to obtain the algal bio-adhesives ready for plywood process. The solid content is about 35%.

The plywood using above algal bio-adhesive was produced according to the same method as example 10.

Example 5C: Preparation of Algal Bio-Adhesive

*Spirulina* dry powder was obtained commercially and it contains about 60% protein. 10 kg of the algae, 1 kg of calcium oxide powder (200 meshes) and 1 kg of sodium silicate was added and mixed for 30 mins. To the mixture, 1 kg of PMDI was slowly added during mixing within 20 mins and blended for further 30 mins to obtain a well mixed blend. The blend was sealed and stored overnight for 10 hours, and then transferred to an Air-Jet milling machine to obtain fine powder with particle size around 38 μm. In a 100 L high-shear mixing vessel for producing coating material, 40 L water was added, and then 10 kg of above milled powder was added and mixed for 30 mins. To the mixture, 1.0 kg of waterborne blocked polyisocyanates (WB905) was added and mixed for 60 mins. 100 g of defoaming agent was added to obtain the algal bio-adhesives ready for plywood process. The solid content is about 20%.

The plywood using above algal bio-adhesive was produced according to the same method as example 10.

Example 6C: Application of Algal Bio-Adhesives for Preparation of Particle Board Algal bio-adhesive produced in example 2C was used to prepare particle board. 150 g of algal bio-adhesive was added slowly to 600 g of pine wood particles having a moisture content of approximately 5% and mixed with a mechanical mixer. A 9-inch×9 inch×9 inch wood forming box was centered on a 12 inch×12 inch×0.1 inch stainless steel plate, which was covered with aluminum foil. The wood-adhesive mixture is slowly added into the forming box to achieve a uniform density of particles coated with bio-adhesive. The mixture was compressed by hand with a plywood board and the wood forming box was carefully removed so that the particle board matte would not be disturbed. Then, the plywood board was removed, a piece of aluminum foil was placed on the matte, and another stainless steel plate was placed on top of the matte. The particle board matte was then pressed to a thickness of ¾ inch using the following conditions: 120 psi for 10 minutes at a press platen temperature of 170 C. The particle board was trimmed to 5 inches×5 inches to check the water resistant property.

TABLE 2C

Test results of plywood produced from algal bio-adhesives in example 1C-6C

| Plywood | Dry strength (MPa) | Wet strength (MPa) | Water resistance test (boiling water for two hours) |
|---|---|---|---|
| Example 1C | 1.8 | 0.8 | Intact |
| Example 2C | 3.0 | 1.5 | Intact |
| Example 3C | 2.5 | 1.0 | Intact |
| Example 4C | 2.5 | 1.0 | Intact |
| Example 5C | 3.5 | 1.6 | Intact |
| Example 6C | / | / | Intact |
| Formaldehyde-Urea resin | 2.5 | / | Dismembered |
| Phenol-Urea resin | 3.4 | 1.8 | intact |

The invention claimed is:

1. A Distiller's Grain (DG) bio-adhesive comprising 20 to 50% by weight solid content, and 50 to 80% by weight liquid content, in which the solid content comprises:
   50 to 89% by weight of DG mass;
   1 to 20% by weight of a crosslinking agent; and
   10 to 30% by weight of inorganic filler;
   and in which the liquid content comprises:
   0.01 to 5% by weight of a defoaming agent; and
   water.

2. The DG bioadhesive according to claim 1, in which the crosslinking agent is selected from a group consisting of: organic polymeric material with crosslinking groups; inorganic material; and a mixture of polymeric and inorganic material.

3. The DG bioadhesive according to claim 2, in which the inorganic crosslinking agent and the filler are present in a ratio of 4:1 or lower.

4. The DG bio-adhesives in claim 2, wherein the organic polymeric crosslinking agents are selected from a group consisting of: polyisocyanates, polyisocyanates with blocked isocyanate groups and epoxy resins; and the inorganic materials are silicates and/or borates.

5. The DG bioadhesive according to claim 1, in which the filler comprises a calcium compound selected from a group consisting of calcium oxide, calcium hydroxide, calcium carbonate, and calcium sulfate.

6. The DG bio-adhesives in claim 1, wherein the DG sources are from ethanol production byproducts to make biofuel.

7. The DG bio-adhesives in claim 1, wherein the DG is selected from a group consisting of: DDGS, DGS, CDS, WDG or their mixture.

8. The DG bio-adhesives in claim 1, wherein the DG mass has a DG water content less than 70%, preferably less than 40%, most preferably less than 20%.

9. The DG bio-adhesives in claim 1, wherein the DG mass is obtained from WDG without further drying.

10. The DG bio-adhesives in claim 1, wherein the bio-adhesive additionally comprises additives selected from a group consisting of wet strength agent, and thickeners.

11. The DG bio-adhesives as claimed in claim 1 for use in one or more applications selected from the group of: water-resistant wood panel process as substitute of formaldehyde based wood adhesives; water-resistant glue for paper packaging industry; and hospital and school building board decoration, assembling and construction.

12. The DG bio-adhesive of claim 1, in which the defoaming agent is a silicone-based defoaming agent, a polyether based defoaming agent, a higher alcohol defoaming agent, or a food grade defoaming agent selected from the group consisting of mineral oil, vegetable oil or white oil based defoaming agent.

13. The DG bio-adhesive of claim 1, in which the liquid content comprises 0.1-5% by weight defoaming agent, preferably 0.5-5% by weight defoaming agent.

14. A process to prepare DG bio-adhesives in claim 1 comprising the steps of:
   a. Combining DG mass, a cross-linking agent, and fillers to form a blend using a mechanical mixer or blender,
   b. Milling the blend via a micronisation milling machine or any other chosen wet or dry mechanical milling machine to produce powdery material with particle size between 80-600 meshes, preferably, between 100-500 meshes, most preferably 200-300 meshes,
   c. Mixing the powdery material with water and 0.01 to 5% by weight of a defoaming agent, optionally with addition of other additives, so that the resulting bio-adhesive comprises 20 to 50% by weight solid content and 50-80% by weight liquid content.

15. The method according to claim 14, wherein the blend comprises 50-89% of the DG material, 1.0-20% of cross-linking agent and 10-30% of fillers.

16. The method according to claim 14, in which the percentage of each additive to form aqueous bio-adhesives is between 0.01-5%, preferably 0.1-5%.

17. The method according to claim 14, wherein the defoaming agent is a silicone-based defoaming agent, polyether based defoaming agent, a higher alcohol defoaming agent, or a food grade defoaming agent selected from the group consisting of mineral oil, vegetable oil or white oil based defoaming agent.

18. The method according to claim 14, wherein the additives comprise a thickener, which is a water soluble synthetic or natural polymer selected from the group consisting of PVA, Polyacrylic acid (PAA) and PAA copolymer, cellulose derivatives, proteins, alginate and chitosan.

19. The method according to claim 14, wherein the additives comprise a wet strength agent which is polyamideamine-epichlorohydrin (PAE).

20. The method according to claim 14, wherein the additives comprise a crosslinking agent which is a polymeric isocyanate selected from the group consisting of PMDI, PHDI, and polymeric isocyanate with the isocyanate group blocked.

21. The method according to claim 14, in which the DG aqueous bio-adhesives formed in step c have a solid content between 20-50%, preferably 20-40%.

* * * * *

UNITED STATES PATENT AND TRADEMARK OFFICE
CERTIFICATE OF CORRECTION

PATENT NO. : 10,428,254 B2
APPLICATION NO. : 15/110425
DATED : October 1, 2019
INVENTOR(S) : Xiaobin Zhao Page 1 of 1

It is certified that error appears in the above-identified patent and that said Letters Patent is hereby corrected as shown below:

Column 2, Include in Item (56); References Cited:
US Patent 7,618,660 B2 11/2009 Mohanty et al.

Signed and Sealed this
Eighteenth Day of February, 2020

Andrei Iancu
*Director of the United States Patent and Trademark Office*